United States Patent
Rose et al.

(10) Patent No.: US 7,722,080 B2
(45) Date of Patent: *May 25, 2010

(54) AIRBAG CUSHION WITH A FLAP VENT TO OPTIONALLY VENT GAS FOR OUT-OF-POSITION CONDITIONS

(75) Inventors: Larry D. Rose, South Weber, UT (US); Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/528,266

(22) Filed: Sep. 27, 2006

(65) Prior Publication Data

US 2008/0073892 A1    Mar. 27, 2008

(51) Int. Cl.
*B60R 21/16* (2006.01)
(52) U.S. Cl. .................................. 280/743.2
(58) Field of Classification Search .......... 280/743.2, 280/743.1, 740, 739
See application file for complete search history.

(56) References Cited

U.S. PATENT DOCUMENTS

| | | | | |
|---|---|---|---|---|
| 5,016,913 | A | * | 5/1991 | Nakajima et al. ............ 280/738 |
| 5,172,933 | A | * | 12/1992 | Strasser ....................... 280/740 |
| 5,246,250 | A | | 9/1993 | Wolanin et al. |
| 5,280,953 | A | | 1/1994 | Wolanin et al. |
| 5,306,043 | A | | 4/1994 | Mihm et al. |
| 5,350,188 | A | | 9/1994 | Sato |
| 5,405,166 | A | | 4/1995 | Rogerson |
| 5,421,607 | A | | 6/1995 | Gordon |
| 5,492,363 | A | | 2/1996 | Hartmeyer et al. |
| 5,494,314 | A | | 2/1996 | Kriska et al. |
| 5,603,526 | A | * | 2/1997 | Buchanan .................... 280/739 |
| 5,931,497 | A | | 8/1999 | Fischer |
| 6,056,318 | A | | 5/2000 | Braunschadel |
| 6,095,557 | A | | 8/2000 | Takimoto et al. |
| 6,126,196 | A | | 10/2000 | Zimmerman |
| 6,139,048 | A | | 10/2000 | Braunschädel ............ 280/728.1 |
| 6,183,003 | B1 | | 2/2001 | Matsuhashi et al. |
| 6,206,408 | B1 | | 3/2001 | Schneider |
| 6,247,726 | B1 | | 6/2001 | Ryan |
| 6,290,257 | B1 | | 9/2001 | Bunce et al. ................ 280/739 |
| 6,371,509 | B1 | * | 4/2002 | Ellerbrok et al. ............ 280/729 |

(Continued)

FOREIGN PATENT DOCUMENTS

DE    196 40 322    3/1996

(Continued)

OTHER PUBLICATIONS

Office Action issued Nov. 12, 2088 in co-pending U.S. Appl. No. 11/528,265.

(Continued)

*Primary Examiner*—Faye M. Fleming
(74) *Attorney, Agent, or Firm*—Sally J Brown; Stoel Rives LLP

(57) ABSTRACT

An airbag cushion is disclosed for use in automotive protective systems. The airbag cushion includes at least one closeable flap vent for re-directing gas out of the cushion when an obstruction is encountered. The airbag cushion also includes a tether for controlling the closeable flap vent.

24 Claims, 6 Drawing Sheets

U.S. PATENT DOCUMENTS

| | | | |
|---|---|---|---|
| 6,398,258 B2 | 6/2002 | Hamada et al. | |
| 6,631,921 B1 | 10/2003 | Drossler et al. | |
| 6,631,922 B2 | 10/2003 | Hess et al. | 280/730.2 |
| 6,648,371 B2 | 11/2003 | Vendely et al. | 280/739 |
| 6,746,045 B2 | 6/2004 | Short et al. | |
| 6,773,027 B2 | 8/2004 | Bohn et al. | |
| 6,773,030 B2 | 8/2004 | Fischer | |
| 6,832,778 B2 | 12/2004 | Pinsenschaum et al. | |
| 6,863,304 B2 | 3/2005 | Reiter, et al. | |
| 6,918,613 B2 | 7/2005 | Short et al. | |
| 6,932,385 B2 | 8/2005 | Hawthorn et al. | |
| 6,971,671 B2 | 12/2005 | Schneider et al. | |
| 7,059,634 B2 | 6/2006 | Bossecker et al. | 280/739 |
| 7,083,191 B2 | 8/2006 | Fischer | |
| 7,083,192 B2 | 8/2006 | Fischer et al. | |
| 7,210,702 B2 | 5/2007 | Soderquist | |
| 7,237,802 B2 * | 7/2007 | Rose et al. | 280/743.1 |
| 7,261,319 B2 | 8/2007 | DePottey et al. | |
| 7,328,915 B2 * | 2/2008 | Smith et al. | 280/739 |
| 7,347,450 B2 | 3/2008 | Williams et al. | |
| 7,360,789 B2 | 4/2008 | Bito | |
| 7,364,192 B2 | 4/2008 | Braun et al. | |
| 2003/0020266 A1 | 1/2003 | Vendely et al. | |
| 2003/0020268 A1 | 1/2003 | Reiter et al. | |
| 2003/0057691 A1 | 3/2003 | Tokita et al. | |
| 2003/0127839 A1 | 7/2003 | Jenkins | |
| 2003/0209895 A1 | 11/2003 | Gu | |
| 2003/0214125 A1 | 11/2003 | Schneider et al. | |
| 2004/0012179 A1 | 1/2004 | Pinsenschaum et al. | |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0256842 A1 | 12/2004 | Breed et al. | |
| 2005/0052008 A1 | 3/2005 | Rose et al. | |
| 2005/0098990 A1 | 5/2005 | Pinsenschaum et al. | |
| 2005/0236822 A1 | 10/2005 | Rose et al. | |
| 2005/0248137 A1 | 11/2005 | Delventhal et al. | |
| 2006/0071461 A1 | 4/2006 | Williams et al. | |
| 2006/0071462 A1 | 4/2006 | Smith et al. | |
| 2006/0151979 A1 | 7/2006 | DePottey et al. | |
| 2006/0197327 A1 | 9/2006 | Maripudi et al. | |
| 2006/0202454 A1 | 9/2006 | Parizal et al. | |
| 2007/0052222 A1 | 3/2007 | Higuchi et al. | |
| 2007/0108750 A1 | 5/2007 | Bauer et al. | |
| 2007/0126219 A1 | 6/2007 | Williams | |
| 2007/0132222 A1 * | 6/2007 | Thomas et al. | 280/743.2 |
| 2007/0205590 A1 | 9/2007 | Klinkenberger et al. | |
| 2008/0007038 A1 * | 1/2008 | Fischer et al. | 280/743.2 |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0042416 A1 * | 2/2008 | Razazi et al. | 280/743.2 |
| 2008/0073890 A1 | 3/2008 | Williams et al. | |
| 2008/0073891 A1 | 3/2008 | Rose et al. | |
| 2008/0073893 A1 * | 3/2008 | Schneider | 280/740 |
| 2008/0079250 A1 | 4/2008 | Boyle et al. | |

FOREIGN PATENT DOCUMENTS

| | | |
|---|---|---|
| JP | 05085295 | 4/1993 |
| JP | 2001-158315 | 6/2001 |

OTHER PUBLICATIONS

Office Action issued Nov. 18, 2008 in co-pending U.S. Appl. No. 11/528,265.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843.
Response to First Office Action filed in co-pending U.S. Appl. No. 10/832,843.
Interview Summary issued Jun. 15, 2006 in co-pending U.S. Appl. No. 10/832,843.
Notice of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and Response to Office Action filed Feb. 20, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct.05, 2007 in co-pending U.S. Appl. No. 10/959,387.
Office Action issued Jun. 8, 2007 in co-pending U.S. Appl. No. 11/296,031.
Amendment and Response to Office Action filed Dec. 4, 2007 in co-pending U.S. Appl. No. 11/296,031.
Office Action issued Apr. 21, 2008 in co-pending U.S. Appl. No. 11/296,031.
Amendment and Response to Office Action filed Jul. 21, 2008 in co-pending U.S. Appl. No. 11/296,031.
Office Action issued Oct. 21, 2008 in co-pending U.S. Appl. No. 11/296,031.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action filed Feb. 15, 2007 in co-pending U.S. Appl. No. 10/959,256.
Office Action issued May 21, 2007 in co-pending U.S. Appl. No. 10/959,256.
Amendment and Response to Office Action filed Aug. 16, 2007 in co-pending U.S. Appl. No. 10/959,256.
Notice of Allowance issued Nov. 27, 2007 in co-pending U.S. Appl. No. 10/959,256.
Office Action issued Jan. 2, 2009 in co-pending U.S. Appl. No. 11/528,042.
Office Action issued Jul. 11, 2008 in co-pending U.S. Appl. No. 11/528,118.
Amendment and Response to Office Action filed Nov. 24, 2008 in co-pending U.S. Appl. No. 11/528,118.
Interview Summary issued Dec. 15, 2008 in co-pending U.S. Appl. No. 11/528,118.
Notice of Allowance issued Feb. 10, 2009 in co-pending U.S. Appl. No. 11/528,118.
Office Action issued Dec. 2, 2008 in co-pending U.S. Appl. No. 11/758,419.
Office Action issued Apr. 7, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action issued Sep. 26, 2006 in co-pending U.S. Appl. No. 11/031,394.
Interview Summary issued Jan. 23, 2007 in co-pending U.S. Appl. No. 11/031,394.

Amendment and Response to Office Action filed Mar. 26, 20027 in co-pending U.S. Appl. No. 11/031,394.

Notice of Allowance issued May 7, 2007 in co-pending U.S. Appl. No. 11/031,394.

Office Action issued Jun. 25, 2007 in co-pending U.S. Appl. No. 11/031,394.

Notification of Transmittal of the International Search Report and the Written Opinion of the International Searching Authority issued Oct. 19, 2006 in International Application No. PCT/US2005/025416.

Notification of Transmittal of the International Search Report and the Written Opinion of the International Searching Authority issued Dec. 15, 2006 in International Application No. PCT/US2005/027255.

Notification of Transmittal of the International Search Report and the Written Opinion of the International Searching Authority issued Aug. 20, 2007 in International Application No. PCT/US2006/045367.

Notification of Transmittal of the International Search Report and the Written Opinion of the International Searching Authority issued Sep. 5, 2007 in International Application No. PCT/US2006/045441.

Notification of Transmittal of the International Search Report and the Written Opinion of the International Searching Authority issued Mar. 9, 2007 in International Application No. PCT/US2005/038175.

Notification of Transmittal of the International Search Report and the Written Opinion of the International Searching Authority issued Oct. 22, 2008 in International Application No. PCT/US2008/071337.

Notification of Transmittal of the International Search Report and the Written Opinion of the International Searching Authority issued Aug. 15, 2008 in International Application No. PCT/US2008/060226.

* cited by examiner

US 7,722,080 B2

AIRBAG CUSHION WITH A FLAP VENT TO OPTIONALLY VENT GAS FOR OUT-OF-POSITION CONDITIONS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 3A is a perspective view of the partially deployed airbag cushion shown in FIG. 2A with a partial cut-away taken along cutting line 2A-2A to show the open flap vent, tether and a diffuser. While FIG. 2A shows the interior of the partially deployed airbag from the front to the rear, FIG. 3A shows the interior of the partially deployed airbag from the rear to the front.

FIG. 3B is a perspective view of the partially deployed airbag cushion shown in FIG. 2B with a partial cut-away taken along cutting line 2B-2B to show the closed flap vent, tether and a diffuser. While FIG. 2B shows the interior of the partially deployed airbag from the front to the rear, FIG. 3B shows the interior of the partially deployed airbag from the rear to the front.

Figure 1A:
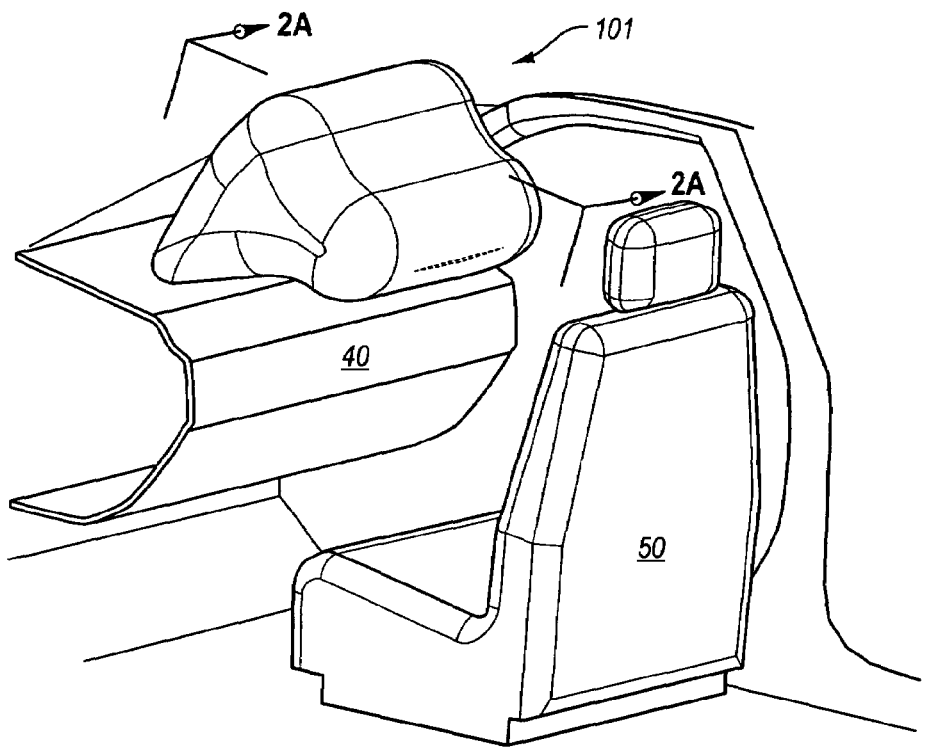
FIG. 1A is a perspective view of an airbag cushion partially deployed from an instrument panel towards a seat (vehicle occupant not shown).

INDEX OF ELEMENTS IDENTIFIED IN THE DRAWINGS 40 instrument panel
50 seat
100 airbag module
101 airbag cushion
102 interior of the airbag cushion 101
102f front portion of interior 102
103t top section of front portion 102f
103b bottom section of front portion 102f
108 throat
110 membrane
111 interior surface of airbag cushion membrane
112 exterior surface of the airbag cushion membrane
113 face surface
116 seam
120 airbag module housing
130 diffuser
131 material
132 opening
133 perimeter of direct opening 134
134 forward opening of diffuser
135 side openings
136 perimeter of side openings 135
150 closeable flap vent
151 rim or diameter of edges of vent aperture
152 flap or flap section
153 flap attachment
154 flap opening
156 side frames of flap opening
158 vent aperture
170 control tether
171 tether holder
173 vent portion
174 fold
176 teeth
178 temporary holding feature
179 tether attachment

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas referred to as an optionally closeable vent for out-of-position (OOP) conditions such as a flap vent or a closeable vent. Each closeable vent may be closed via a component such as a control tether. The tether may be connected at one end to a vent and at an opposing end elsewhere within or on the cushion. A diffuser may also be optionally positioned in the cushion to optimize the flow of gas out of the closeable vents. It is desirable to include a diffuser in most embodiments of the cushion due to the ability of a diffuser to enable the rapid escape of the gas out of the cushion via the closeable vents.

If an occupant is in close proximity to the deploying airbag and restricts normal inflation, the closeable vent remains open and allows gas to rapidly escape. If the occupant is in a normal position and inflation is unrestricted, the tension pulls on the tether to quickly close the closeable vent. Closure retains gas for normal occupant restraint. Thus, the closeable vent may be used as a variable feature in out-of-position conditions and in normal restraint conditions. In this manner, the airbag cushion is sensitive to obstructive expansion of the cushion.

With reference now to the accompanying figures, particular embodiments of the invention will now be described in greater detail. One embodiment of a partially deployed airbag cushion 101 is shown in various views in FIG. 1A, FIG. 2A and FIG. 3A with a flap vent 150 which is open and a control tether 170 which is slack. The same embodiment is shown fully inflated in FIG. 1A, FIG. 2A and FIG. 3A with flap vent 150 which has been closed and control tether 170 in a taut configuration. A second embodiment of flap vent 150' and a control tether 170' are provided in FIGS. 4A-4B and FIGS. 5A-5B. The second embodiment is shown with its flap vent 150' open in FIG. 4A and FIG. 5A and with its flap vent 150' closed in FIG. 4B and FIG. 5B. A third embodiment is shown in FIGS. 6A-6B. The closeable flap vents are closed when the control tethers have been pulled taut due to the expansion of the cushion which is caused by the pressure of the gas in the airbag cushion.

Figure 1B:
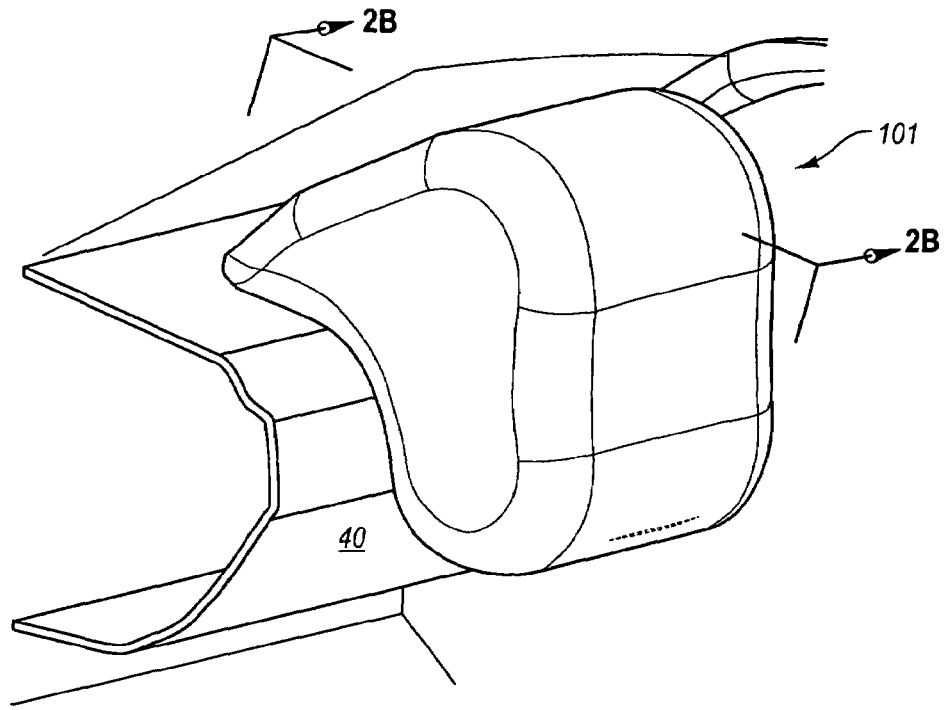
FIG. 1B is a perspective view of an airbag cushion fully deployed from an instrument panel towards a seat (vehicle occupant not shown).

FIGS. 1A-1B show an airbag cushion 101 deploying from instrument panel 40. To better view airbag cushion 101, an occupant is not shown in seat 50. FIG. 1A is a perspective view which shows an airbag cushion 101 as it would appear if it encountered an obstacle such as an out-of-position occupant. FIG. 1B is a perspective view which shows an airbag cushion 101 as it would appear without encountering an obstacle.

Figure 2A:
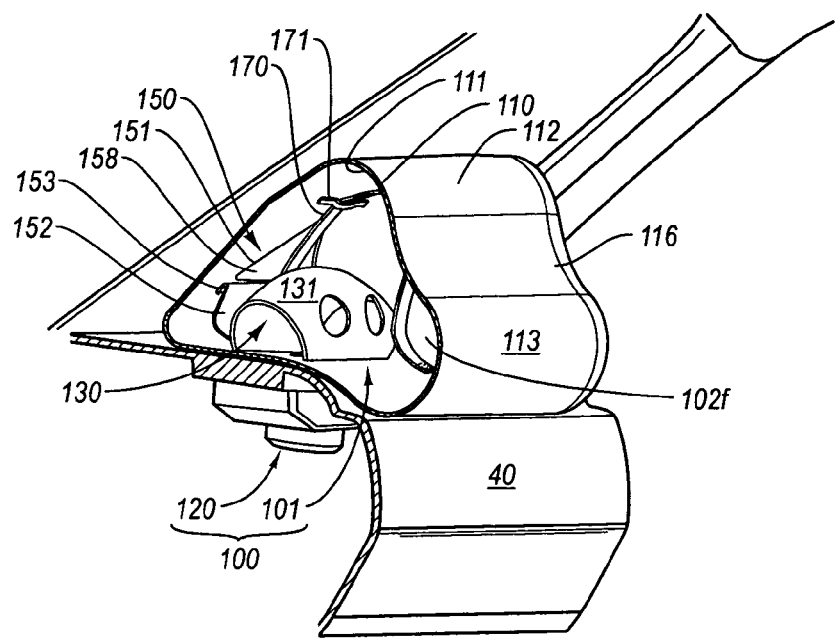
FIG. 2A is a perspective view of the partially deployed airbag cushion shown in FIG. 1A with a partial cut-away taken along cutting line 2A-2A to show the open flap vent, tether and a diffuser.
Figure 2B:
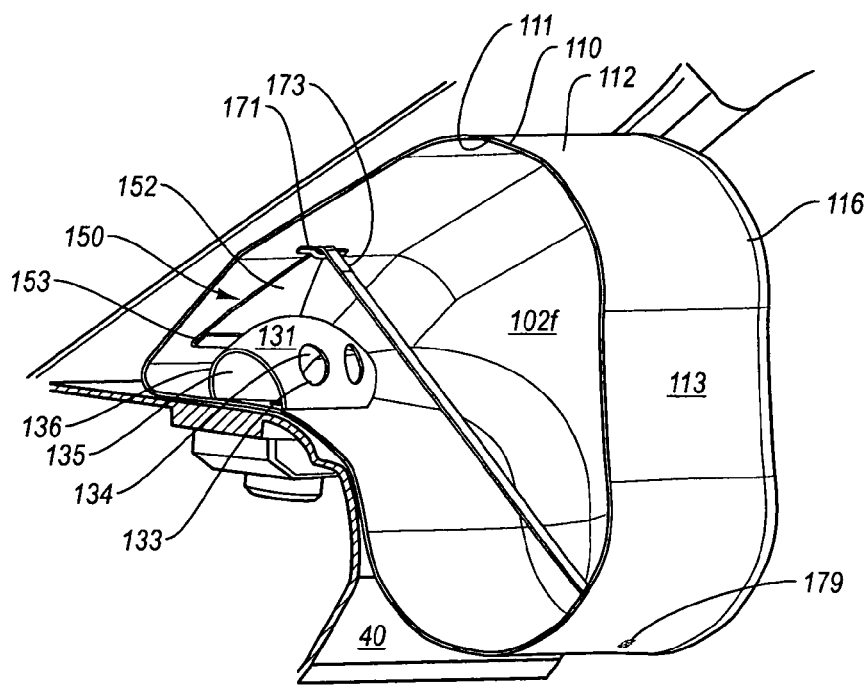
FIG. 2B is a perspective view of the fully deployed airbag cushion shown in FIG. 1B with a partial cut-away taken along cutting line 2B-2B to show the closed flap vent, tether and a diffuser.

FIGS. 2A-2B provide cut-away, perspective views of airbag cushion 101 and instrument panel 40 as shown respectively in FIGS. 1A-1B. In addition to airbag cushion 101, another component of airbag module 100 is also shown in FIGS. 2A-2B, airbag module housing 120, which is positioned under instrument panel 40. Another component of the airbag module is an inflator (not shown) which is housed within airbag module housing 10 to inflate airbag cushion 101 with inflation gas.

As mentioned above, airbag cushion 101 features a flap vent 150 which is controlled via a control tether 170. Another component is a diffuser 130. Each of these components are described in detail below.

Airbag cushion 101 has an interior 102 with a front portion 102f. As best seen in FIG. 3B, front portion 102f has a top section 103t and a bottom section 103b. Inflation gas passes from the inflator (not shown) and into interior 102 via a throat opening (shown only in FIGS. 6A-6B) in membrane 110 which is defined by a throat 108 (shown only in FIGS. 6A-6B). After passing through the throat opening, diffuser 130 directs the inflation gas within interior 102. As shown in FIG. 3B, top section 103t and bottom section 103b of front portion 102f significantly expands as airbag cushion 101 becomes fully deployed.

Membrane 110 has an interior surface 111 and exterior surface 112. The portion of the exterior surface facing the vehicle occupant is face surface 113. The various sections of membrane material are held together at seams 116. Of course, membrane 110 may also be formed from a single integral material.

Optional diffuser 130 is configured to create a pressure pocket and re-direct the inflation gas. The embodiment of the diffuser shown in the figures at 130 is pentagon shaped and comprises a material 131 which may be integral with cushion membrane 110 or attached to cushion membrane 110. For example, diffuser 130 may be sewn together with cushion membrane 110. Gas enters via a diffuser opening (not shown) which corresponds with the throat opening (shown only in FIGS. 6A-6B). Perimeter 133 defines forward openings 134. Forward openings 134 assist with normal inflation of cushion 100 to assist in getting cushion 100 in position in time for dynamic loading purposes. Each side opening 135 is respectively defined by a perimeter 136. Note that while only one side of the diffuser is shown, there is a side opening opposite the side opening shown at 135. The gas is directed out of forward openings 134 and side openings 135. Note that in other embodiments, the optional diffuser may have other shapes and the openings may have different sizes and numbers.

Side openings 135 may be strategically sized, as shown in FIG. 2B, relative to forward openings 134 to allow a greater volume to flow laterally than flows forward toward the occupant. This flow pattern enables airbag cushion 101 to inflate laterally at a quick rate while also partially inflating in a forward direction toward the occupant. In an another embodiment, the diffuser may be configured to re-direct gas at the flap vent during at least a particular stage of deployment.

Closeable flap vent 150 is best seen in FIGS. 2A-2B. As shown in FIG. 2A, the edges of membrane 110 define a vent aperture 158 and are referred to as rim 151 or diameter of the vent aperture. Vent aperture 158 in membrane 110 provides an opening for gas to exit interior 102 of airbag cushion 101 when via closeable flap vent 150 is open. Flap 152 extends within interior 102 of airbag cushion 101. Flap 152 may be attached to cushion membrane 110 via a flap attachment 153 which in this embodiment is an anchor stitching. In another embodiment, the flap may integrally extend from the cushion membrane. Flap 152 has a configuration which enables it to close vent aperture 158 as shown in FIG. 2B. Flap 152 may have a shape which corresponds with the shape of vent aperture 158 and be sized slightly larger than vent aperture 158. In other embodiments, the flap may have a different shape but still be larger than the vent aperture. The flap and flap aperture may have any suitable shape such as round, elliptical, rectangular, triangular, or polygon shapes. The flap and flap aperture may have any size which enables the flap vent to close. The design permits the flap vent to be a low-stress element in the cushion assembly which is helpful during unfolding of the cushion and pressurization. The flap may comprise a nylon woven fabric-type or other suitable material known in the art. Note that the embodiments detailed herein have a single closeable vent for illustrative purposes. However, the airbag cushion 101 may include multiple vents to provide required +-venting capability.

Flap 152 may be connected to or integrally extend from control tether 170. Tether 170 has a portion which rides in tether holder 171 referred to herein as a vent portion 173. The vent portion may also include the flap and other adjacent features such as the flap attachment 153. Vent portion 173 is shown extending from the apex of triangular flap 152. Tether 170 is configured to move with the expansion of airbag cushion 101 to enable vent portion 173 to close closeable vent 150. As tether 170 passes through tether holder 171, flap 152 is lifted toward vent aperture 158. More particularly, flap 152 is moved until the apex of flap 152 is over the apex of vent aperture 158 so that vent 150 is closed. In the embodiment depicted in FIG. 2A, vent portion 173 has a length that is sufficient to allow vent 150 to remain in an open configuration during partial deployment. The tether may be much narrower than the flap or the width of the tether and the flap may be about the same.

Figure 3A:
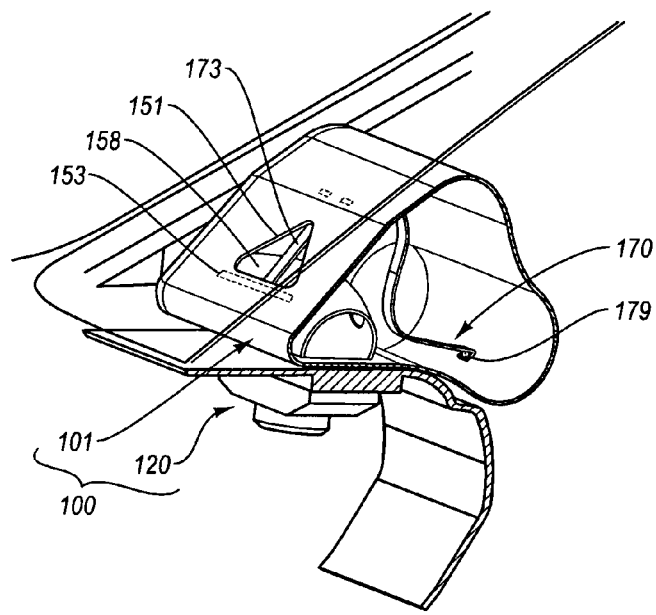
Figure 3B:
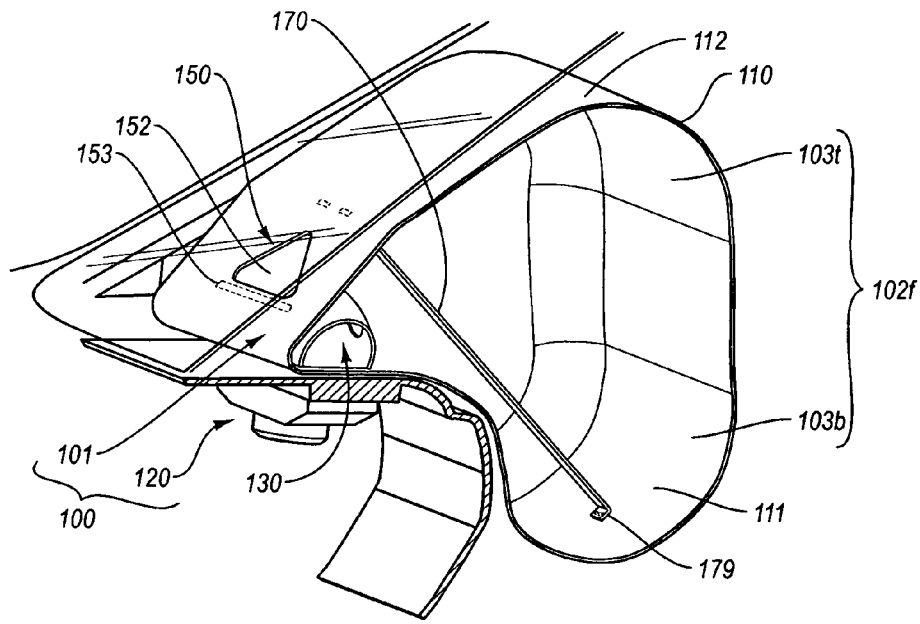

As shown in FIGS. 3A-3B, the end of tether 170 opposite from vent portion 173 is connected to cushion membrane 110 via a tether attachment 179. In this embodiment, tether attachment 179 is stitching between tether 170 and cushion membrane 110. While the depicted tether attachment serves as an anchor for an end of the tether, in another embodiment, the tether is not fixedly anchored but is moveably anchored to cushion membrane 110 via a tether attachment which is essentially a loop that permits movement of the tether. The tether attachment may be disposed elsewhere such as proximate to a different portion of interior surface 111. Alternatively, the tether attachment may be at exterior surface 112. For example, the tether attachment may be at the bottom of the face surface 113, which is the surface of the airbag cushion directed to the occupant. The location of the tether attachment 179 depends on module deployment angle, vehicle interior geometry, and cushion fold type. The tether 170 may comprise a nylon material or other suitable material known in the art. Tether attachment 179 may also be located at the base of a fold and the fold may be stitched together with an optional tack stitch as disclosed in U.S. patent application Ser. No. 11/528,265 titled PRE-FOLDED AIRBAG CUSHION WITH OPTIONAL VENTING FOR OUT-OF-POSITION CONDITIONS which was filed on Sep. 27, 2006. This application is hereby incorporated by reference.

Note that vent 150 is in close proximity to diffuser 130 and the throat (not shown) which is the opening for the gas to enter into airbag cushion 101. While only one vent is shown, in other embodiments two or more vents may be utilized to vent gas in a similar or identical way to vent 150. The closeable vent(s) may be located anywhere in the cushion membrane such as the sides or bottom. A closeable vent located in the windshield side, as shown, provides ample space for venting the inflation gas.

As best seen In FIG. 3A, the initially deploying airbag cushion 101 has a control tether 170 which is slack. In the initial breakout of airbag cushion 101, closeable flap vent 150 is open. Because cushion 101 is initially in a folded condition, at initial breakout (such as the initial 7 milliseconds), closeable flap vent 150 is initially non-functional. When an occupant is not positioned directly in front of the airbag cushion 101 in FIG. 3A, cushion 101 unfolds and is allowed to pressurize normally. If an occupant is in close proximity to airbag cushion 101 and restricts normal inflation, vent panel 150 remains open allowing inflation gas to escape. This configuration reduces the energy of the cushion and minimizes the risk of injury.

If an occupant is in a normal position and inflation is unrestricted, vent 150 is quickly closed as the cushion expands and gas is retained for normal occupant restraint. FIG. 3B provides the best view of tether 170 pulled taut so that the closeable vent 150 is closed.

Early in a normal inflation, gas loss through flap vent 150 is minimal even with diffuser 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of the throat. Since pressure outside the cushion is still atmospheric, there is a pressure imbalance and air flows into the cushion, not out of the cushion, when the vent is positioned alongside of the gas flow stream and not in its path. This phenomenon allows the vent to be in close proximity to the inflation source, as shown. Once cushion pressure begins to increase and gas flow from the inflator starts to tail off, the flap vent needs to be closed Fixed vents (not shown) which remain open may also be utilized in addition to a closeable vent to release gas. Such fixed vents provide restraint control and may be located anywhere in the cushion membrane such as in the side panels of the cushion membrane near the closeable vent. Fixed vents also provide consistent venting of airbag cushion 101 and are not restricted by an occupant's position. In addition to remaining open, fixed vents also differ from closeable vent 170 as the fixed vents are typically smaller. Fixed vents may be optional in certain cushion embodiments based on venting requirements. Like the locations for closeable vents, the location for fixed vents may vary as does the number of vents.

FIGS. 4A-4B and FIGS. 5A-5B depict another embodiment of an airbag cushion at 101'. More particularly, airbag cushion 101' features another embodiment of a flap vent and a tether as identified respectively at 150' and 170'.

Figure 4A:
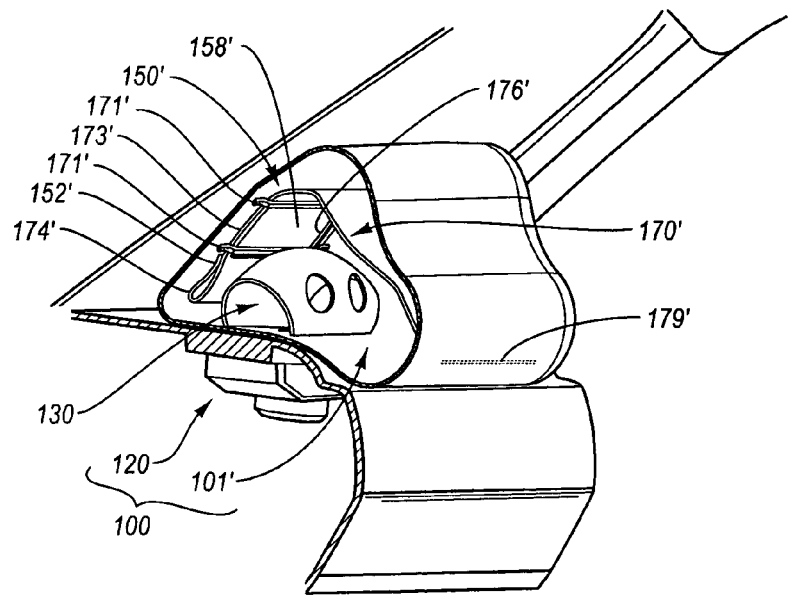
FIG. 4A is a perspective view of another embodiment of an airbag cushion with a partial cut-away to show the open flap vent, tether and a diffuser.
Figure 4B:
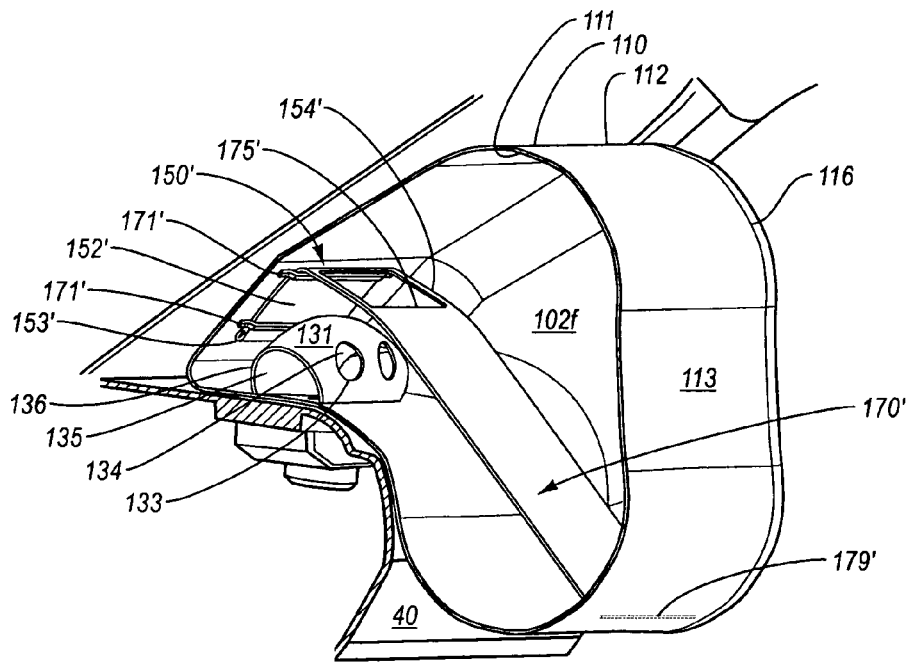
FIG. 4B is a perspective view of the embodiment of the airbag cushion shown in FIG. 4A with a partial cut-away to show the closed flap vent, tether and a diffuser.
Figure 5A:
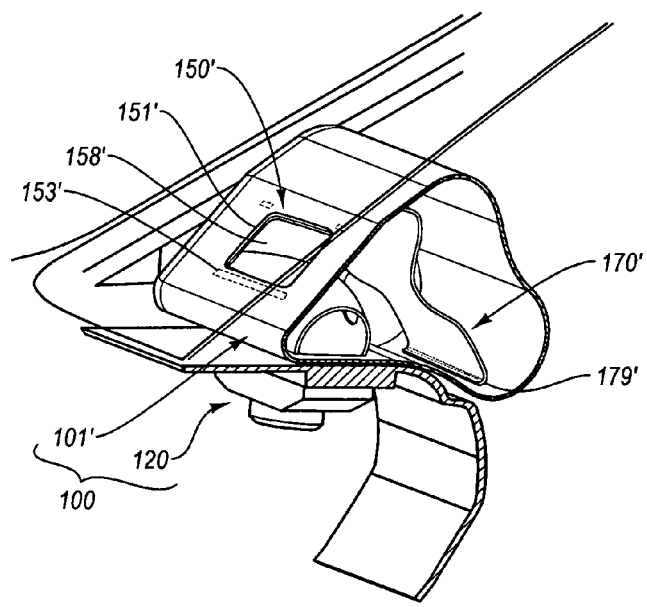
FIG. 5A is a perspective view of the partially deployed airbag cushion shown in FIG. 4A which shows the interior of the partially deployed airbag from the rear to the front as opposed to the front-to-rear view provided in FIG. 4A.
Figure 5B:
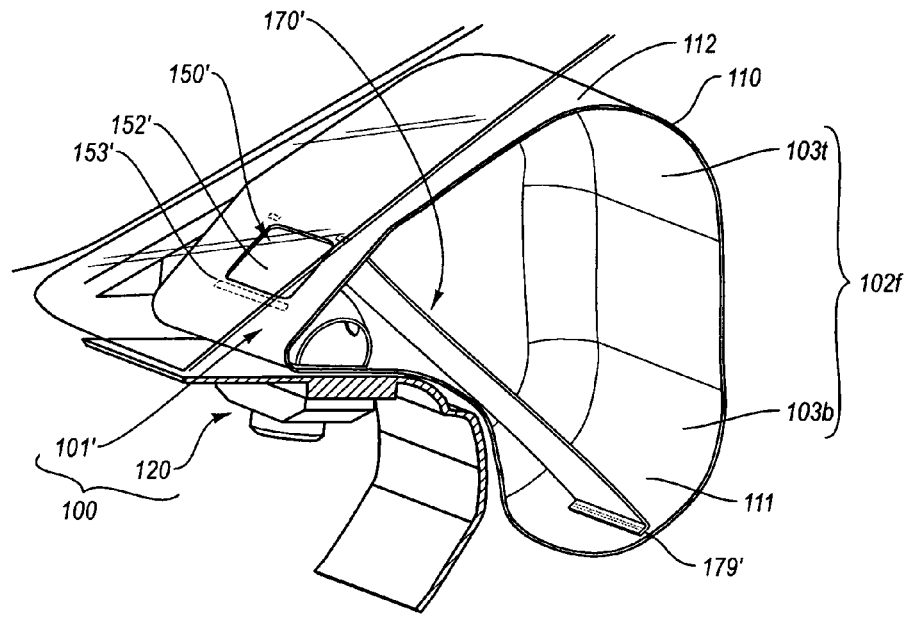
FIG. 5B is a perspective view of the fully deployed airbag cushion shown in FIG. 4B which shows the interior of the fully deployed airbag from the rear to the front as opposed to the front-to-rear view provided in FIG. 4B.
Figure 6A:
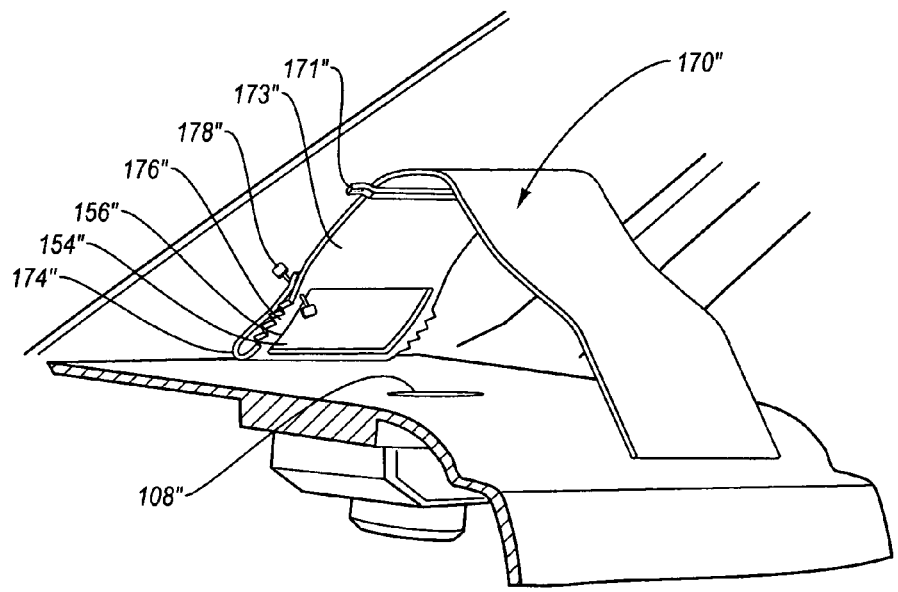
FIG. 6A is an enlarged perspective view of another embodiment of an airbag cushion with a partial cut-away to show the flap vent, tether and the throat for entry of the inflation gas from the inflator into airbag cushion.
Figure 6B:
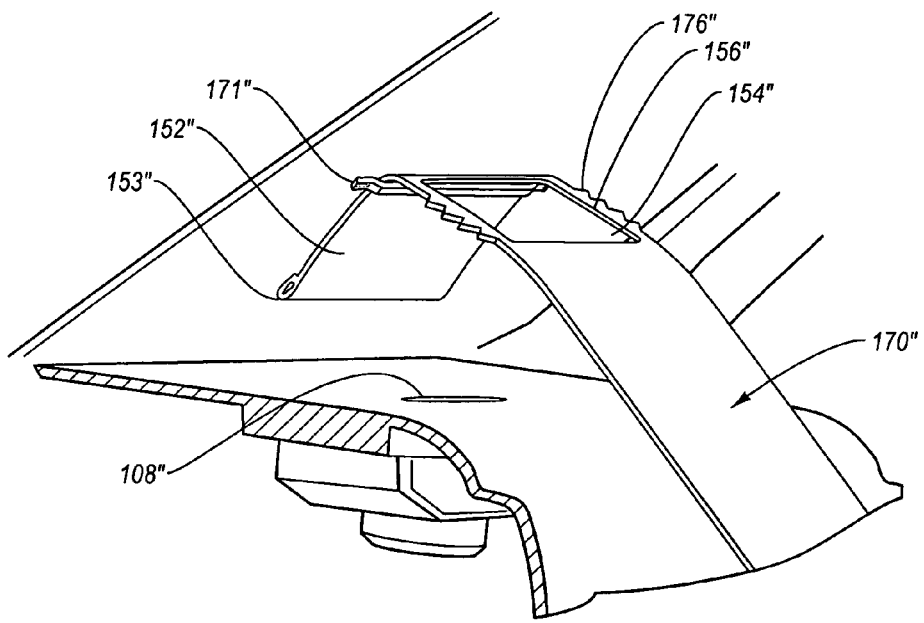
FIG. 6B is an enlarged perspective view of the embodiment of the airbag cushion shown in FIG. 6A with a partial cut-away to show the closed flap vent, diffuser and the throat of the airbag cushion.

As best seen in FIG. 5A, closeable flap vent 150' has a vent aperture 158' defined by a rim or diameter of edges 151' which has a quadrilateral configuration. As shown in FIG. 4A, flap opening 154' is initially aligned with vent aperture 158' to permit venting. When an obstruction is encountered, flap opening 154' and vent aperture 158' remain aligned. When there is no obstruction, airbag cushion 101' fully inflates as shown in FIG. 4B which causes control tether 170' to become taut. The movement of control tether moves flap 152' into alignment with vent aperture 158' to prevent venting from occurring. Flap 152' has a quadrilateral configuration which is shaped like vent aperture 158'. Flap 152' is essentially a rectangular flap section as it is an integral extension of tether 170'. Of course, the flap may also be attached to the tether at the vent portion. Flap attachment 153 has a configuration which securely anchors flap 152' to cushion membrane 110. As shown in FIG. 4A, flap opening 154' is defined by side frames 156' on its sides and a top edge 175' opposite from a bottom edge.

Like airbag cushion 100, flap 152' of airbag cushion 100' generally matches the shape of vent aperture 158' but is larger to permit a sealing effect. As the control tether 170 pulls flap vent 150 closed, loading is transmitted primarily along the outer edges of flap 152' to flap attachment 153'. This creates a desirable perimeter tension that prevents flap 152' from being forced by internal pressure out of vent aperture 158'. Preventing flap 152' from extending out of vent aperture 158' avoids a large leak from occurring.

Two tether holders 171' are used to hold vent portion 173' of control tether 170'. So a single tether holder may be used as shown in airbag cushion 100 or a plurality of tether holders may be used. The tether holder may also have other configurations. For example, the tether holder may be simply two slits in the cushion membrane. Tether 170' further differs from tether 170 as it has a width that is the same as flap 152.

FIGS. 6A-6B provide an enlarged perspective views of another embodiment of an airbag cushion. Unlike the other embodiments, there is not a diffuser in the airbag cushion so inflation gas enters the interior of airbag cushion directly via the throat opening defined by throat 108". In contrast with the embodiment depicted in FIGS. 4A-4B and FIGS. 5A-5B, flap vent 150" is initially closed as a segment of vent portion 173" blocks venting of gas via vent aperture (not shown in FIGS. 6A-6B).

Vent portion 173" has a flap 152 and a flap opening 154" which are held in a fold 174" by a temporary holding feature 178. The particular temporary holding feature is a plastic fastener much like those used to hold price tags to clothing. While only a single fold is shown, other embodiments may have more than at least one fold. Temporary holding features may also be used with the other embodiments. For example, it may be useful for a temporary holding feature to be used to retain the control tether and prevent inadvertent closing of the flap vent during shipping and handling and to ensure that the tether remains slack during initial deployment of the airbag. Another example of a temporary holding feature is tack stitching which is designed to be easily broken and provides no interference to airbag cushion deployment. Other examples of releasable temporary holding features include adhesives, clips, hook and loop fasteners, knots, etc. Such releasable temporary holding features are examples of means for temporarily and releasably holding a portion of an airbag in a folded configuration.

Vent portion 173" also has teeth 176" which permit the vent portion to advance within tether holder 171" and become locked. After a pair of teeth 176" pass through tether holder 171", it is not possible for the pair to move backwards. While a plurality of pairs are shown, a single pair of teeth could also be utilized.

Embodiments of vents which can be closed via a tether attached to the membrane cushion are also disclosed in U.S. patent application Ser. No. 11/528,118 titled AIRBAG CUSHION WITH A LACED VENT TO OPTIONALLY VENT GAS FOR OUT-OF-POSITION CONDITIONS which was filed on Sep. 27, 2006; U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 7, 2005; U.S. patent application Ser. No. 11/295,953 titled LOCKING MECHANISM FOR A CINCH TUBE TO VENT GAS OF AN AIRBAG CUSHION which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004. These applications are hereby incorporated by reference.

Various embodiments for closeable vents have been disclosed herein. The closeable flap vents disclosed herein are examples of flap vent means for selectively venting gas out of the airbag. The flaps are examples of means for covering a vent aperture in the cushion membrane to vent gas out of the airbag. A control tether, as disclosed herein, is an example of means for restricting gas venting by moving the covering means upon inflatable airbag deployment without obstruction and enabling the vent aperture to remain uncovered upon inflatable airbag deployment with obstruction. The control tether is also an example of means for restricting gas venting by closing the venting means upon inflatable airbag deployment without obstruction and enabling the venting means to remain open upon inflatable airbag deployment with obstruction. The diffusers disclosed herein are examples of means for diffusing gas within an airbag cushion by re-directing inflation gas received from an inflator.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112¶6.

The invention claimed is:

1. An airbag module, comprising:
  an inflatable airbag cushion comprising a cushion membrane which defines an interior of the inflatable airbag cushion;
  at least one closeable vent comprising a vent aperture in the cushion membrane and a flap extending within the interior of the cushion membrane, wherein the flap is intially positioned adjacent to the vent aperture such that the vent is open, wherein the flap has a size and shape that permits the flap to be positioned over the vent aperture to cover the vent aperture; and
  a tether anchored to the cushion membrane , wherein the tether extends from the flap, wherein upon deployment of the inflatable airbag cushion with obstruction, the tether does not fully extend and the vent remains open, and upon deployment of the inflatable airbag cushion without obstruction, the tether extends to move the flap until the flap covers the vent aperture without altering the dimensions of the vent aperture such that the vent is at least partially closed.

2. The airbag module of claim 1, wherein the flap is attached to the cushion membrane via a flap attachment.

3. The airbag module of claim 1, wherein the tether extends integrally from the flap.

4. The airbag module of claim 1, further comprising at least one tether holder through which the tether extends; and wherein the tether moves through the tether holder as the airbag cushion expands.

5. The airbag module of claim 1, wherein the tether is anchored to the cushion membrane via a tether attachment.

6. The airbag module of claim 1, wherein the tether is anchored to an interior surface of the cushion membrane.

7. The airbag module of claim 1, wherein the tether is anchored to the cushion membrane within the vicinity of a face of the airbag cushion.

8. The airbag module of claim 1, wherein the tether is fixedly anchored to the cushion membrane.

9. The airbag module of claim 1, wherein the tether is moveably anchored to the cushion membrane.

10. The airbag module of claim 1, wherein the flap is prevented from covering the vent aperture by a temporary holding feature.

11. The airbag module of claim 1, wherein the movement of the vent portion of the tether is restricted by a temporary holding feature.

12. The airbag module of claim 1, further comprising at least one tether holder through which the tether extends and moves as the airbag cusion expands; wherein the tether holder is positioned perpendicularly with respect to the tether; and wherein movement of the tether is perpendicular with respect to the tether holder.

13. The airbag module of claim 1, further comprising a diffuser configured to re-direct inflation gas within the airbag cushion.

14. The airbag module of claim 1, further comprising a fixed vent disposed on the airbag and adapted to vent gas during airbag deployment with and without obstruction.

15. An airbag module, comprising:
an inflatable airbag cushion comprising a cushion membrane which defines an interior of the inflatable airbag cushion;
at least one closeable vent comprising a vent aperture in the cushion membrane and a flap extending within the interior of the cushion membrane, wherein the flap has a size and shape which enable it to cover the vent aperture; and
a tether anchored to the cushion membrane, wherein the tether extends through a tether holder positioned near the vent aperture, wherein the tether is configured such that upon deployment of the inflatable airbag cushion with obstruction, the tether does not fully extend and the vent remains open, and upon deployment of the inflatable airbag cushion without obstruction, the tether extends and at least partially closes the vent.

16. The airbag module of claim 15, wherein the tether holder is a loop attached to the cushion membrane.

17. The airbag module of claim 15, wherein the flap is attached to the cushion membrane via a flap attachment.

18. The airbag module of claim 15, wherein the flap is triangular shaped.

19. The airbag module of claim 15, wherein the flap is rectangular shaped.

20. The airbag module of claim 15, wherein the flap is located at a vent portion of the tether.

21. The airbag module of claim 20, wherein a flap opening is located at the vent portion of the tether and is configured and sized to permit inflation gas to vent out of the inflatable airbag cushion via the vent aperture.

22. The airbag module of claim 15, further comprising a diffuser configured to receive inflation gas via a throat in the cushion membrane and re-direct inflation gas within the airbag cushion, and wherein the vent is located near the diffuser.

23. An airbag module, comprising:
an inflatable airbag cushion having a cushion membrane;
means for covering a vent aperture in the cushion membrane to vent gas out of the airbag;
means for restricting gas venting by moving the covering means upon inflatable airbag deployment without obstruction and enabling the vent aperture to remain uncovered upon inflatable airbag deployment with obstruction, wherein the means for restricting gas venting is anchored to the cushion membrane within the vicinity of a face of the airbag cushion and extends from the covering means.

24. The airbag module of claim 23, further comprising means for diffusing gas within an airbag cushion by re-directing inflation gas received from an inflator.

* * * * *